(12) United States Patent
Jeon et al.

(10) Patent No.: US 9,565,963 B2
(45) Date of Patent: Feb. 14, 2017

(54) STEAM GENERATOR AND COOKING APPARATUS HAVING THE SAME

(71) Applicant: SAMSUNG ELECTRONICS CO., LTD., Suwon-si, Gyeonggi-do (KR)

(72) Inventors: In Ki Jeon, Hwaseong (KR); Sun Ki Kim, Suwon (KR); Hae Sang Jung, Hwaseong (KR); Ga Young Jo, Seongnam (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 520 days.

(21) Appl. No.: 13/971,610

(22) Filed: Aug. 20, 2013

(65) Prior Publication Data

US 2014/0060339 A1    Mar. 6, 2014

(30) Foreign Application Priority Data

Aug. 30, 2012 (KR) .................. 10-2012-0095360

(51) Int. Cl.
*A47J 27/04* (2006.01)
*A21B 3/04* (2006.01)
(Continued)

(52) U.S. Cl.
CPC .................. *A47J 27/04* (2013.01); *A21B 3/04* (2013.01); *F22B 1/284* (2013.01); *F22B 1/285* (2013.01);
(Continued)

(58) Field of Classification Search
CPC ..... A21B 3/04; F24C 15/327; A47J 2027/043; A47J 27/04; H05B 6/6479
(Continued)

(56) References Cited

U.S. PATENT DOCUMENTS 5,552,578 A * 9/1996 Violi .................. A21B 3/04
126/20
7,759,615 B2 * 7/2010 Ando .................. A21B 3/04
126/20
(Continued)

FOREIGN PATENT DOCUMENTS

CN       1946970 A    4/2007
CN    101233366 A    7/2008
(Continued)

OTHER PUBLICATIONS

European Search Report issued Jan. 23, 2014 in corresponding European Application No. 13181614.2.
(Continued)

*Primary Examiner* — Reginald L Alexander
(74) *Attorney, Agent, or Firm* — Staas & Halsey LLP

(57) ABSTRACT

Disclosed herein are a steam generator capable of preventing water inflow into a cooking compartment and easily discharging water therefrom and a cooking apparatus having the steam generator. The steam generator includes a first part to store water therein, a second part extending from the first part and having a smaller width than the first part, a heater disposed in the first part to heat water in the first part, and a temperature sensor mounted to an outer surface of the first part to detect a temperature of the heater. Whether the steam generator lacks water is determined by detecting a temperature of the heater using the temperature sensor.

13 Claims, 6 Drawing Sheets

(51) Int. Cl.
*H05B 6/64* (2006.01)
*F24C 15/32* (2006.01)
*F22B 1/28* (2006.01)

(52) U.S. Cl.
CPC .......... *F24C 15/327* (2013.01); *H05B 6/6479* (2013.01); *A47J 2027/043* (2013.01)

(58) Field of Classification Search
USPC .......... 99/467, 474, 476; 219/401, 400, 682, 219/681; 126/369
See application file for complete search history.

(56) References Cited

U.S. PATENT DOCUMENTS

| | | | | |
|---|---|---|---|---|
| 7,989,737 B2* | 8/2011 | Jeon | .................. | A47J 27/04 |
| | | | | 126/20 |
| 8,704,138 B2* | 4/2014 | Sells | .................. | A23L 1/0121 |
| | | | | 126/20 |
| 2010/0034526 A1 | 2/2010 | Kleemann et al. | | |
| 2015/0173553 A1* | 6/2015 | Park | .................. | A21B 3/04 |
| | | | | 219/401 |

FOREIGN PATENT DOCUMENTS

| | | |
|---|---|---|
| DE | 102009055146 | 6/2011 |
| EP | 1 731 840 | 12/2006 |
| EP | 2 037 183 | 3/2009 |
| EP | 2366315 A1 | 9/2011 |
| KR | 10-2009-0108827 | 10/2009 |
| KR | 10-2009-0109190 | 10/2009 |
| KR | 10-2011-0098444 | 9/2011 |

OTHER PUBLICATIONS

Chinese Office Action dated Oct. 8, 2016 in related Chinese Patent Application No. 201310386359.2 (7 pages) (8 pages English Translation).

* cited by examiner

STEAM GENERATOR AND COOKING APPARATUS HAVING THE SAME

CROSS-REFERENCE TO RELATED APPLICATIONS

This application claims the benefit of Korean Patent Application No. 10-2012-0095360, filed on Aug. 30, 2012 in the Korean Intellectual Property Office, the disclosure of which is incorporated herein by reference.

BACKGROUND

1. Field

Embodiments of the present disclosure relate to a steam generator capable of preventing water inflow into a compartment and easily discharging water therefrom and an apparatus having the steam generator.

2. Description of the Related Art

A microwave oven is an appliance in which microwaves emitted from a magnetron are radiated into a cooking compartment to change the arrangement of water molecules in food contained in the cooking compartment, thereby causing the food to be cooked. By simultaneously heating both the inside and outside of food, defrosting or cooking time may be significantly shortened. In addition, the microwave oven may have features of a small size, easy installation, convenient usage and the like, in comparison with a gas oven or a gas stove which uses gas as a heat source.

So as to enable a user to conveniently cook, microwave ovens capable of performing various cooking processes, such as a rice cooking function, fish roasting function, steaming function and the like, have been recently developed. Cooking apparatuses with an oven function using a heater as an additional heat source have been also developed. Further, in order to improve a texture of food and minimize destruction of nutrients in food, cooking apparatuses equipped with a steam generator have been developed, in which steam is supplied to a cooking compartment and food is cooked by indirect heating through steam.

Cooking food using a cooking apparatus with a steam generator may significantly reduce loss of nutrients, such as vitamin C which is easily destroyed by heat. Further, when cooking food preserved with salt, such as fish, salt in the food is reduced and the food becomes moist with a crispy skin by virtue of steam.

SUMMARY

It is an aspect of the present disclosure to provide a steam generator capable of preventing water inflow into a cooking compartment and easily discharging water therefrom.

It is one aspect of the present disclosure to provide a steam generator equipped with a sensor to detect whether the steam generator lacks water by measuring a temperature of a heater.

It is a one aspect of the present disclosure to provide a cooking apparatus having the above steam generator.

Additional aspects will be set forth in part in the description which follows and, in part, will be obvious from the description, or may be learned by practice of the invention.

In accordance with one aspect, a cooking apparatus includes a main body defining a cooking compartment therein, the cooking compartment being formed with a steam supply hole at a portion thereof to spray steam into the cooking compartment, a chamber mounted to the main body to store water therein, a steam generator mounted to the main body to supply steam to the cooking compartment through the steam supply hole, a water supply pump to pump water from the chamber to the steam generator, a drain pump to pump water from the steam generator to the chamber, and a heater disposed in the steam generator. The steam generator includes a first part in which water supplied from the chamber is stored, and a second part extending upward from the first part and having a smaller width than the first part's width.

The first part may be provided with a water inlet and a water outlet at a bottom surface thereof. Water may flow into the first part through the water inlet from the chamber, and water may be discharged from the first part through the water outlet.

The water inlet may be connected to the water supply pump, and the water outlet may be connected to the drain pump.

The bottom surface of the first part may be sloped so that water remaining in the first part gathers toward the water outlet.

The second part may be provided with a steam supply port at a portion thereof, through which steam is discharged from the second part. The steam supply port may be connected to the steam supply hole.

The cooking apparatus may further include a steam supply duct mounted to the steam supply hole, and a connection tube to connect the steam supply duct and the steam supply port, the connection tube being made of a flexible material.

The chamber may be provided with a water supply part and a water outlet. The water supply part may be connected to the water supply pump, and the water outlet may be connected to the drain pump.

The heater may be disposed in the first part.

The first part may be formed with a connection hole at an upper portion of thereof, through which the heater is connected to a heater driving unit.

The steam generator may further include a temperature sensor mounted to an outer surface of the first part, the temperature sensor being located at a position corresponding to a position of the heater.

The temperature sensor may detect a temperature of the heater to measure a water level in the first part.

The temperature sensor may transmit information of the detected temperature to a control unit. If the temperature detected by the temperature sensor exceeds a reference value, the control unit may drive the water supply pump.

The steam generator may be formed by a pair of cases which are bonded to each other to define a space therebetween.

Water remaining in the steam generator may be pumped by the drain pump and discharged to the chamber.

In accordance with one aspect, a steam generator includes a first part to store water therein, a second part extending from the first part and having a smaller width than the first part's width, a heater disposed in the first part to heat water in the first part, and a temperature sensor mounted to an outer surface of the first part to detect a temperature of the heater.

The temperature sensor may transmit information of the detected temperature of the heater to a control unit. If the temperature detected by the temperature sensor exceeds a reference value, the control unit may operate to supply water to the first part.

The second part may be provided with a steam supply port at an upper portion thereof, through which steam generated from the first part is discharged.

The first part may be provided with a water inlet and a water outlet at a bottom surface thereof. Water may flow into the first part through the water inlet, and water may be discharged from the first part through the water outlet.

The bottom surface of the first part may have a sloped portion, and the water outlet may be positioned at the sloped portion so that water remaining in the first part gathers toward the water outlet.

The heater may be shaped to have plural bent portions, and the temperature sensor may be located at a position corresponding to a position of an uppermost portion of the heater.

As described above, water may be prevented from flowing or splashing into the cooking compartment from the steam generator. In addition, the water remaining in the steam generator may be easily discharged from the steam generator. Further, whether the steam generator lacks water may be determined by detecting a temperature of the heater using the temperature sensor.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
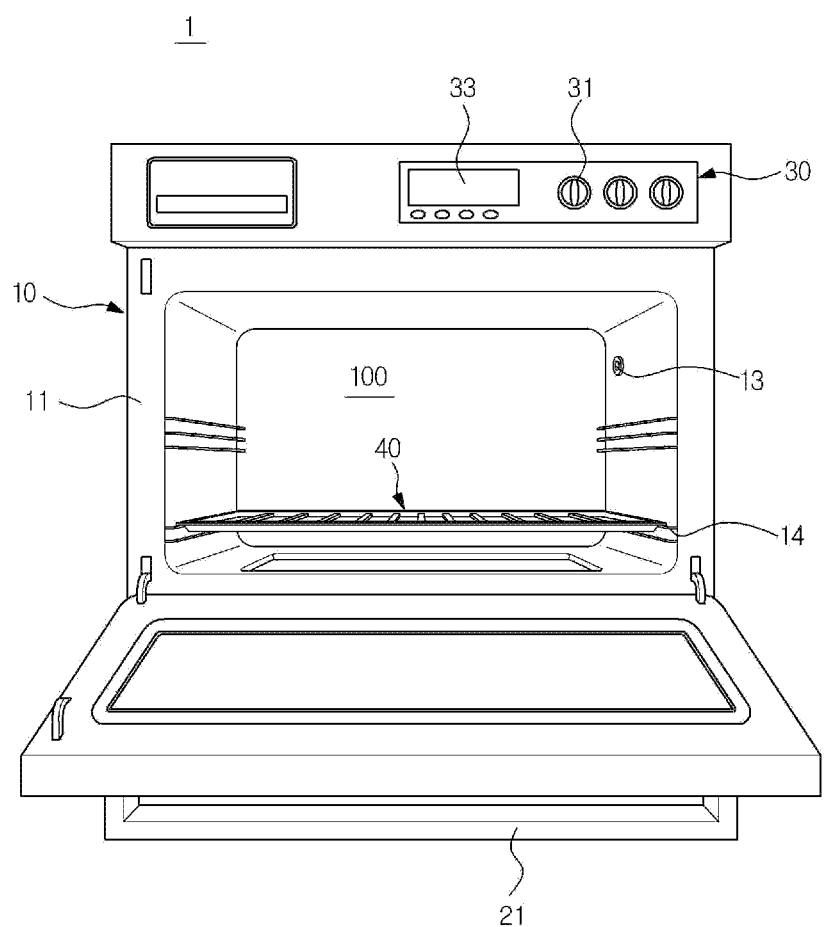
FIG. 1 is a perspective view illustrating a cooking apparatus according to an embodiment.

Reference will now be made in detail to the embodiments, examples of which are illustrated in the accompanying drawings, wherein like reference numerals refer to like elements throughout.

FIG. 1 is a perspective view illustrating a cooking apparatus according to an embodiment.

Referring to FIG. 1, a cooking apparatus 1 comprises a main body 10, a cooking compartment 11 provided inside the main body 10 to receive materials to be cooked therein, and a door 20 provided at a front portion of the main body 10 to open and close an entrance of the cooking compartment 11. A control panel 30, through which a user may select various cooking conditions, such as output power of the cooking apparatus 1, cooking time and the like, is provided at the front portion of the main body 10. The main body 10 includes a housing 11 defining an appearance and a frame 12 to which various components including a steam generator are mounted.

The control panel 30 includes an input unit 31 and a display unit 33. A user may select various cooking conditions, such as output power of the cooking apparatus, cooking functions, cooking time, cancel and the like, through the input unit 31. The display unit 33 may display the user's selections of cooking conditions and the operation state of the cooking apparatus using characters, numbers, symbols and the like.

An insulator (not shown) is interposed between the housing 11 and the frame 12 so as to enclose the cooking compartment. A convection-heating unit may be provided at a portion of the cooking compartment 100, and a microwave-heating unit including a magnetron may be provided at another portion of the cooking compartment 100. A grill-heating unit to emit radiant heat toward materials to be cooked may be further provided above or below the cooking compartment 100.

A tray 40, on which materials to be cooked are placed, is disposed in the cooking compartment 100. A rail 14 to support the tray 40 to slide therealong is provided at an inner lateral wall of the main body 10 defining the cooking compartment 100.

A steam supply hole 13 is formed at a portion of the main body 10 defining the cooking compartment 100, through which steam is sprayed into the cooking compartment 100. The steam supply hole 13 may be positioned at an inner upper portion of the cooking compartment 100.

Figure 2:
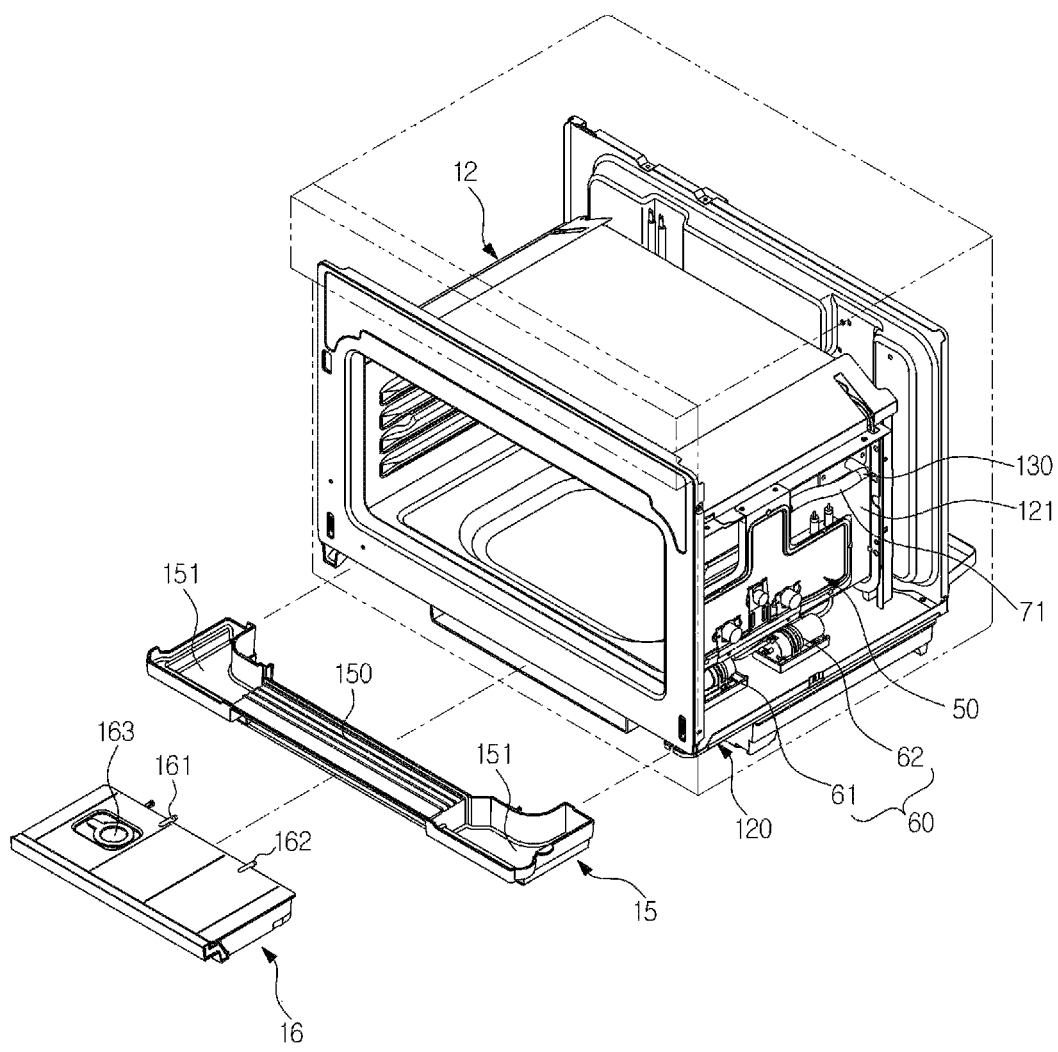
FIG. 2 is an exploded perspective view of the cooking apparatus according to the embodiment.
Figure 3:
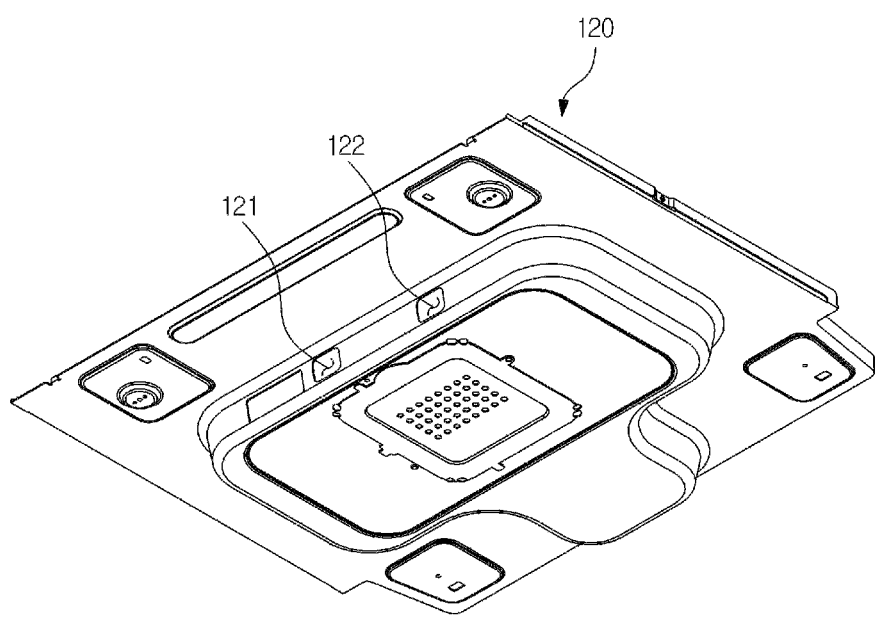
FIG. 3 is a view illustrating a bottom surface of a base part of a frame of the cooking apparatus according to the embodiment.

FIG. 2 is an exploded perspective view of the cooking apparatus according to the embodiment, and FIG. 3 is a view illustrating a bottom surface of a base part of the frame of the cooking apparatus according to the embodiment.

Referring to FIGS. 2 and 3, the cooking apparatus 1 includes a steam generator 50 mounted to a lateral surface of the frame 12. A water collecting tray 15 and a chamber 16 are provided under the frame 12. The frame 12 includes a base part 120 and a lateral part 121.

The water collecting tray 15 and the chamber 16 may be disposed at a bottom surface of the base part 120 of the frame 12. The chamber 16 may be directly mounted to the base part 120 of the frame 12, or may be inserted into a space formed at the water collecting tray 15. The water collecting tray 15 and the chamber 16 are removably mounted to the base part 120 of the frame 12.

The water collecting tray 15 includes a guide part 150 and water storage parts 151. The water storage parts 151 may be respectively disposed at both ends of the guide part 150. The guide part 150 is provided with plural protrusions communicating the water storage parts 151 provided at both ends of the guide part 150 with each other so that water leaking from the cooking compartment 100 may flow toward the water storage parts 151. The water leaking from the cooking compartment 100 may flow toward the water storage parts 151 through recesses, each of which is defined by two adjacent protrusions. Since the water collecting tray 15 is removably mounted to the bottom surface of the base part 120 of the frame 12, a user may remove the water collecting tray 15 to wash the same or drain off water from the water storage parts 151.

The chamber 16 includes a water supply part 161, a water outlet 162 and a water inlet 163. Water may by supplied to the steam generator 50 from the chamber 16 through the water supply part 161, and the water discharged from the steam generator 50 may flow into the chamber 16 through the water outlet 162. A cap is removably coupled to the water inlet 163. A user may remove the cap to spray water into the chamber 16 through the water inlet 163 or drain off water from the chamber 16.

The steam generator 50 is mounted to the lateral surface of the frame 12. The steam generator 50 is connected to the steam supply hole 13 to supply steam to the cooking compartment 100. A steam supply duct 130 is mounted to the lateral surface of the frame 12 to communicate with the steam supply hole 13. The steam generator 50 includes a steam supply port 513 formed with a hole. The steam supply duct 130 and the steam supply port 513 are connected by a connection tube 71. Accordingly, the steam generated from the steam generator 50 may be supplied to the cooking compartment 100 through the steam supply port 513, the connection tube 71, the steam supply duct 130 and the steam supply hole 13.

The connection tube 71 may be made of a flexible material to connect the steam supply duct 130 and the steam supply port 513 of the steam generator 50. Even though the positions of the steam generator 50 and the steam supply hole 13 are changed, the steam supply port 513 and the steam supply hole 13 may be connected using the connection tube 71.

A pump 60 is mounted to an upper surface of the base part 120 of the frame 12. The pump 60 includes a drain pump 61 and water supply pump 62. The drain pump 61 and the water supply pump 62 are connected to the steam generator 50 and the chamber 16.

The base part 120 of the frame 12 is formed with holes 121 and 122, through which the water supply part 161 and the water outlet 162 of the chamber 16 pass. The water supply part 161 of the chamber 16 is connected to the water supply pump 62 and the water outlet 162 of the chamber 16 is connected to the drain pump 61 through the holes 121 and 122. The steam generator 50 includes a water inlet 515 and a water outlet 516, which will be described later. The water inlet 515 of the steam generator 50 is connected to the water supply pump 62, and the water outlet 516 of the steam generator 50 is connected to the drain pump 61. The drain pump 61 pumps the remaining water from the steam generator 50 to the chamber 16, and the water supply pump 62 pumps the stored water from the chamber 16 to the steam generator 50.

Figure 4:
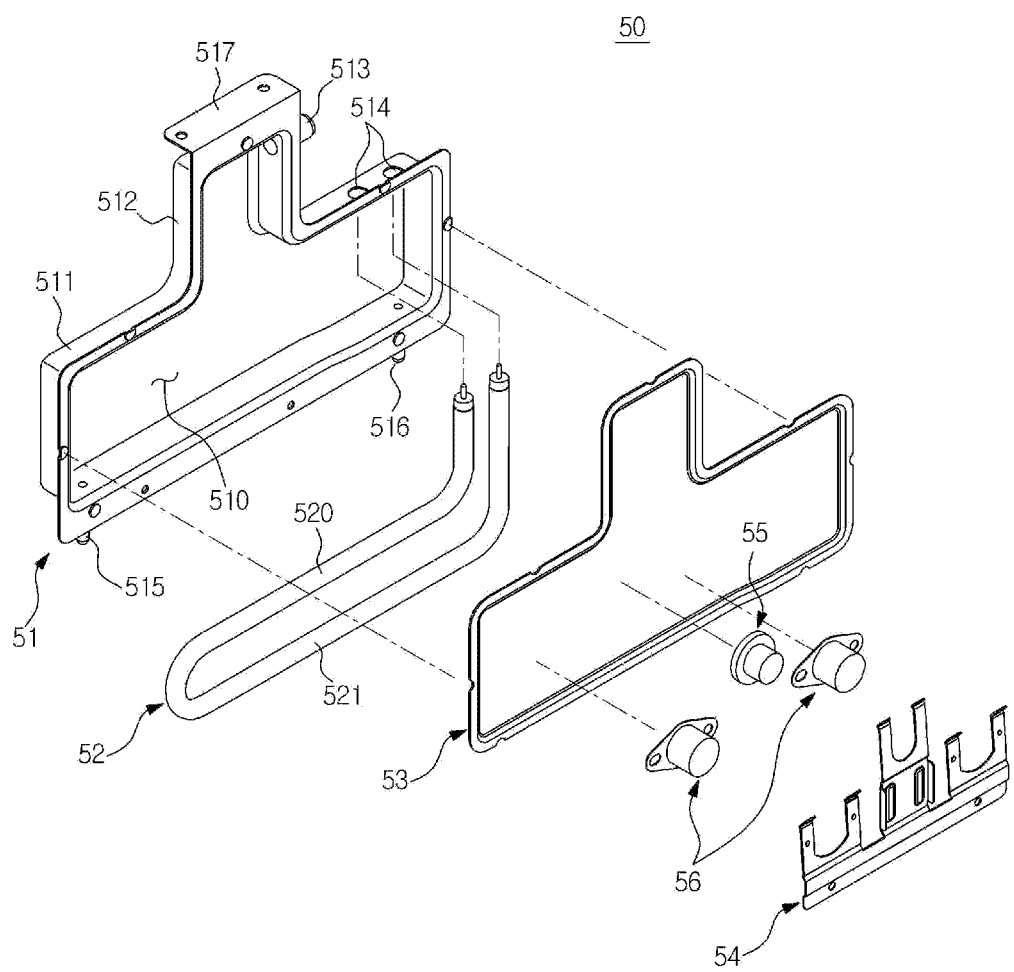
FIG. 4 is an exploded perspective view of a steam generator according to the embodiment.

FIG. 4 is an exploded perspective view of the steam generator according to the embodiment.

As shown in FIG. 4, the steam generator 50 includes a first case 51, a heater 52, a second case 53 and a temperature sensor 55. The first case 51 and the second case 53 may be bonded to each other to define a space therebetween. The structure of bonding the first case 51 and the second case 53 may reduce manufacturing costs and decrease working hours in comparison with fabricating the case of the steam generator 50 by molding.

The steam generator 50 is provided with a body part 511 and a neck part 512. The neck part 512 has a smaller width than a width of the body part 511, and extends upward from the body part 511. The water pumped by the water supply pump 62 is stored in the body part 511. The body part 511 and the neck part 512 define a unitary space. Herein, the body part 511 may be referred to as a first part, and the neck part 512 may be referred to as a second part.

The body part 511 is provided with a water inlet 515 and a water outlet 516. The water inlet 515 and the water outlet 516 may be formed with holes at a bottom surface of the body part 511. The water inlet 515 is connected to the water supply pump 62, so that the water stored in the chamber 16 may be pumped by the water supply pump 62 and supplied to the body part 511. The water outlet 516 is connected to the drain pump 61, so that the water remaining in the body part 511 may be pumped by the drain pump 61 and discharged to the chamber 16.

The steam supply port 513 is provided at the neck part 512. The steam supply port 513 may be formed with a hole at a lateral surface of the neck part 512. If the water stored in the body part 511 is evaporated into steam, the steam may be discharged through the steam supply port 513 provided at the neck part 512. Because water does not fill the neck part 512 and the width of the neck part 512 is smaller than that of the body part 511, the water heated in the body part 511 is prevented from boiling over and being discharged through the steam supply port 513.

The heater 52 is disposed in the space defined between the first case 51 and the second case 53 of the steam generator 50. A connection hole 514 is formed at an upper surface of the body part 511, through which the heater 52 is connected to a heater driving unit (not shown) provided outside the steam generator 50. The heater 52 may be shaped to have plural bent portions, so as to heat the water in the steam generator 50 more rapidly by increasing a contact area between the heater 52 and the water. The heater 52 may be disposed in the body part 511, and may be located apart from an inner surface of the body part 511 by about 3 mm. However, the shape and arrangement of the heater 52 are not limited to this configuration.

The temperature sensor 55 is mounted to an outer surface of the case of the steam generator 50. The temperature sensor 55 may be mounted to the outer surface of the body part 511 at a position corresponding to a position of the heater 52 disposed in the body part 511. Specifically, the temperature sensor 55 may be located at a position corresponding to a position of the uppermost portion of the heater 52. As shown in FIG. 4, if the heater 52 is shaped to have one bent portion to be divided into an upper heater portion 520 and a lower heater portion 521, the temperature sensor 55 is located corresponding to a position of the upper heater portion 520 and detects a temperature of the upper heater portion 520. By detecting the temperature of the heater 52, the temperature sensor 55 also serves to detect a level of the water stored in the body part 511 of the steam generator 50. Functions of the temperature sensor 55 to detect the level of the water stored in the body part 511 will be described later.

The temperature sensor 55 transmits the detected temperature information of the heater-located area to a control unit (not shown). If the detected temperature exceeds a reference value, the control unit determines that a sufficient amount of water is not in the body part 511, and drives the water supply pump 62, thereby supplying the water from the chamber 16 to the body part 511.

In detail, in a normal state, the water level in the body part 511 is slightly higher than the position of the heater 52 such that the heater 52 may be completely immersed in the water, and the water in the body part 511 is heated by the heater 52 to generate steam. For example, the temperature detected by the temperature sensor 55 when the heater 52 is completely immersed in the water may range from about 95° C. to about 98° C. However, when the water level becomes low such that a portion of the heater 52 emerges from the water as the steam is generated; the detected temperature may range from about 105° C. to about 110° C. When the temperature detected by the temperature sensor 55 during steam generation is in the range of about 95° C. to about 98° C., the control unit drives the water supply pump 62 so as to supply water to the body part 511 for about 1 second per every about 4 seconds. When the temperature detected by the temperature sensor 55 exceeds about 105° C., the control unit drives the water supply pump 62 so as to continuously supply water to the body part 511 for about 5 seconds. However, the period of time of supplying water to the body part 511 is not limited to the aforementioned period of time. The period of time of supplying water or the amount of water supplied to the body part 511 may be properly adjusted as long as the water does not enter the neck part 512. The method of supplying water to the body part 511 when the temperature detected by the temperature sensor 55 exceeds a reference value is not limited to the aforementioned method.

The reference value may be set to a temperature greater than the boiling point of water (about 100° C.), and may be properly selected in consideration of safety of the steam generator 50. Because water boils at the temperature of about 100° C., when the temperature detected by the temperature sensor 55 is much greater than 100° C. (i.e., greater than the reference value), the control unit determines that the heater 52 is driven while not being completely immersed in the water. For example, the reference value may be set to about 105° C. When the temperature detected by the temperature sensor 55 exceeds the reference value, the control unit operates to supply more water to the steam generator 50, thereby preventing hazardous situations due to overheating of the heater 52.

As described above, by virtue of the process of detecting the water level in the steam generator 50 using the temperature sensor 55 without an additional water level sensor, timely water supply to the steam generator 50 may be achieved. In addition, because the temperature sensor 55 is mounted to the outer surface of the case of the steam generator 50, installation thereof and repair or replacement due to breakdown may be easily accomplished.

The steam generator 50 may further include an overheating prevention circuit unit 56. The overheating prevention circuit unit 56 may be mounted to the outer surface of the case of the steam generator 50. If the heater 52 keeps being driven even when a sufficient amount of water is not in the steam generator 50, the overheating prevention circuit unit 56 shuts off power of the heater 52. For example, if the heater 52 keeps being driven even when the steam generator 50 heats beyond a temperature of the reference value due to breakdown of the temperature sensor 55, the overheating prevention circuit unit 56 shuts off power of the heater 52, thereby preventing overheating.

The temperature sensor 55 and the overheating prevention circuit unit 56 may be mounted to the outer surface of the case of the steam generator 50 using a bracket 54, for example, in such a manner that the temperature sensor 55 and the overheating prevention circuit unit 56 are screw-coupled to the bracket 54 and the bracket 54 is screw-coupled to the outer surface of the case of the steam generator 50.

Figure 5:
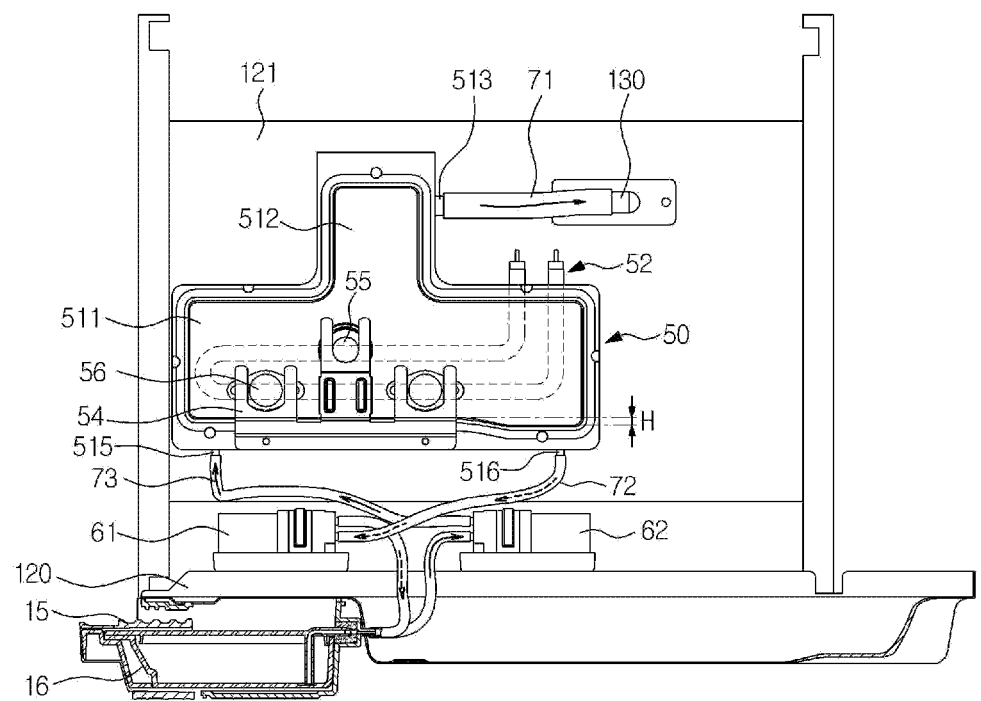
FIG. 5 is a view illustrating the steam generator mounted to a lateral part of the frame of the cooking apparatus according to the embodiment.
Figure 6:
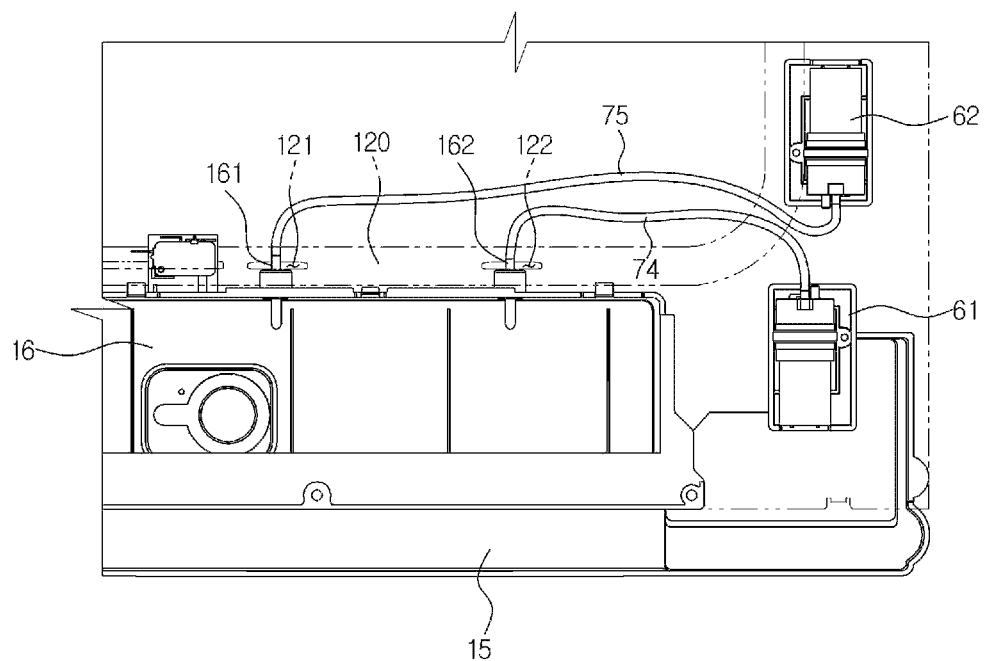
FIG. 6 is a view illustrating a portion of the base part of the frame of the cooking apparatus according to the embodiment.

FIG. 5 is a view illustrating the steam generator mounted to the lateral part of the frame of the cooking apparatus according to the embodiment, and FIG. 6 is a view illustrating a portion of the base part of the frame of the cooking apparatus according to the embodiment.

Referring to FIGS. 5 and 6, the steam generator 50 is connected to the drain pump 61 and the water supply pump 62, and the drain pump 61 and the water supply pump 62 are connected to the chamber 16.

If the temperature of the heater 52 detected by the temperature sensor 55 exceeds the reference value, the control unit determines that the heater 52 is overheated and the steam generator 50 lacks water, and drives the water supply pump 62 to supply the water from the chamber 16 to the steam generator 50. The water supplied to the steam generator 50 is stored in the body part 511. The water is heated by the heater 52 in the body part 511, and the steam generated by the heater 52 moves to the neck part 512 and is discharged through the steam supply port 513. Because the steam supply port 513 is connected to the steam supply duct 130 by the connection tube 71, the steam from the steam generator 50 may move into the cooking compartment 100 via the connection tube 71, the steam supply duct 130 and the steam supply hole 13.

When steam supply is finished, the control unit may drive the drain pump 61 in order to discharge the remaining water from the steam generator 50. The water remaining in the body part 511 may be pumped by the drain pump 61 and may move to the chamber 16. When a cooking process using the steam is completed, a user may input a drain command through the input unit 31 provided at the control panel 30, to thereby drive the drain pump 61. Alternatively, the drain pump 61 may be automatically driven when a cooking process is completed.

The body part 511 of the steam generator 50 may include a sloped bottom surface. In detail, on the basis of the base part 120 of the frame 12, a height of the region of the bottom surface of the body part 511 provided with the water outlet 516 may be lower than that of the region provided with the water inlet 515. Accordingly, the water in the body part 511 may gather at the region provided with the water outlet 516, and may be more smoothly discharged from the steam generator 50 through the water outlet 516.

According to the cooking apparatus having the above-described steam generator, water may be prevented from flowing or splashing into the cooking compartment from the steam generator. In addition, water remaining in the steam generator may be easily and smoothly discharged from the steam generator. Further, whether the steam generator lacks water may be accurately determined by detecting a temperature of the heater using the temperature sensor mounted to the outer surface of the case of the steam generator.

As seen above, the few embodiments show the application of the disclosed steam generator within, for example, a cooking apparatus. However, this disclosure is not solely limited to cooking apparatus, but can be applied to any type of apparatus using a steam generator. Although a few embodiments have been shown and described, it would be appreciated by those skilled in the art that changes may be made in these embodiments without departing from the principles and spirit of the invention, the scope of which is defined in the claims and their equivalents.

What is claimed is:
1. A cooking apparatus comprising:
a main body defining a cooking compartment therein, the cooking compartment being formed with a steam supply hole at a portion thereof to spray steam into the cooking compartment;
a chamber mounted to the main body to store water therein;
a steam generator mounted to the main body to supply steam to the cooking compartment through the steam supply hole;
a water supply pump to pump water from the chamber to the steam generator;
a drain pump to pump water from the steam generator to the chamber; and
a heater disposed in the steam generator,
wherein the steam generator includes a first part in which water supplied from the chamber is stored, and a second part extending upward from the first part and having a smaller width than the first part's width, and
a temperature sensor mounted to an outer surface of the first part, the temperature sensor being located at a position corresponding to a position of the heater.
2. The cooking apparatus according to claim 1, wherein the first part is provided with a water inlet and a water outlet at a bottom surface thereof, and wherein water flows into the first part through the water inlet from the chamber, and water is discharged from the first part through the water outlet.

3. The cooking apparatus according to claim 2, wherein the water inlet is connected to the water supply pump, and the water outlet is connected to the drain pump.

4. The cooking apparatus according to claim 2, wherein the bottom surface of the first part is sloped so that water remaining in the first part gathers toward the water outlet.

5. The cooking apparatus according to claim 1, wherein the second part is provided with a steam supply port at a portion thereof, through which steam is discharged from the second part, and wherein the steam supply port is connected to the steam supply hole.

6. The cooking apparatus according to claim 5, further comprising:
a steam supply duct mounted to the steam supply hole; and
a connection tube to connect the steam supply duct and the steam supply port, the connection tube being made of a flexible material.

7. The cooking apparatus according to claim 1, wherein the chamber is provided with a water supply part and a water outlet, and wherein the water supply part is connected to the water supply pump, and the water outlet is connected to the drain pump.

8. The cooking apparatus according to claim 1, wherein the heater is disposed in the first part.

9. The cooking apparatus according to claim 8, wherein the first part is formed with a connection hole at an upper portion of thereof, through which the heater is connected to a heater driving unit.

10. The cooking apparatus according to claim 1, wherein the temperature sensor detects a temperature of the heater to measure a water level in the first part.

11. The cooking apparatus according to claim 1, wherein the temperature sensor transmits information of the detected temperature to a control unit, and wherein if the temperature detected by the temperature sensor exceeds a reference value, the control unit drives the water supply pump.

12. The cooking apparatus according to claim 1, wherein the steam generator is formed by a pair of cases which are bonded to each other to define a space therebetween.

13. The cooking apparatus according to claim 1, wherein water remaining in the steam generator is pumped by the drain pump and discharged to the chamber.

* * * * *